Aug. 11, 1936.  I. E. McELROY ET AL  2,050,358
VARIABLE SPEED PULLEY
Filed Nov. 13, 1933   3 Sheets-Sheet 1
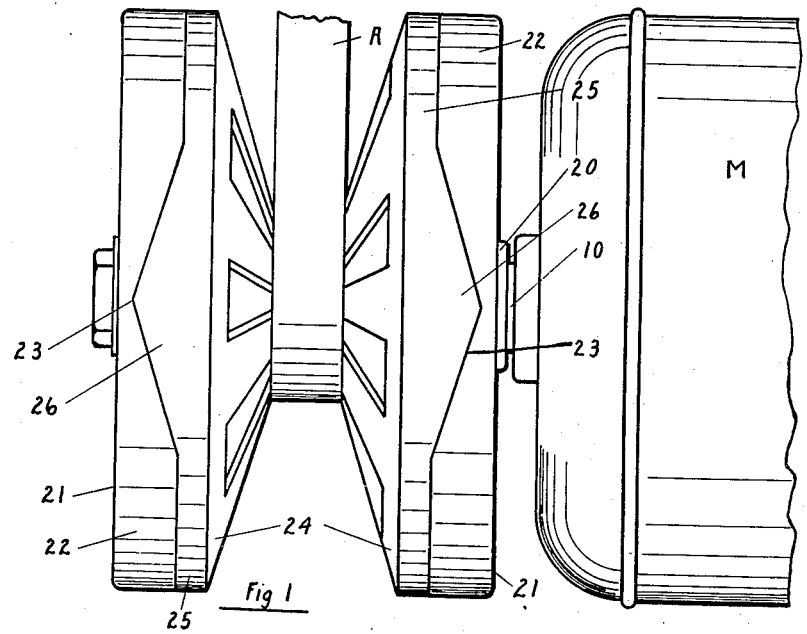
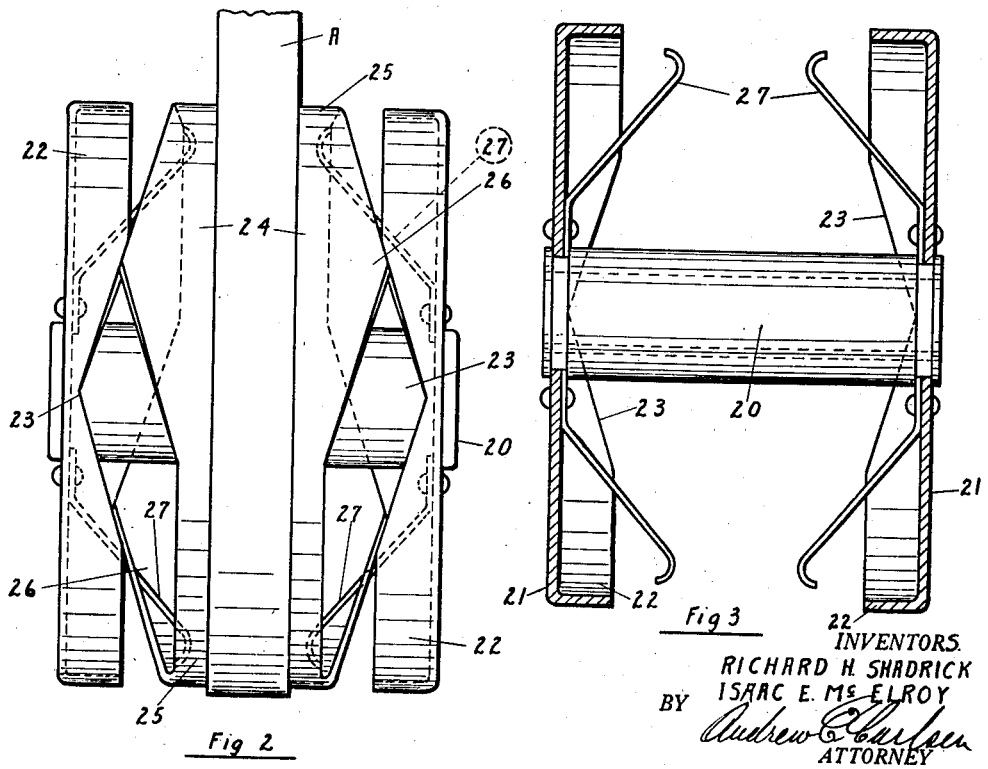
INVENTORS.
RICHARD H. SHADRICK
ISAAC E. McELROY
BY
ATTORNEY Aug. 11, 1936. I. E. McELROY ET AL 2,050,358
VARIABLE SPEED PULLEY
Filed Nov. 13, 1933 3 Sheets-Sheet 2
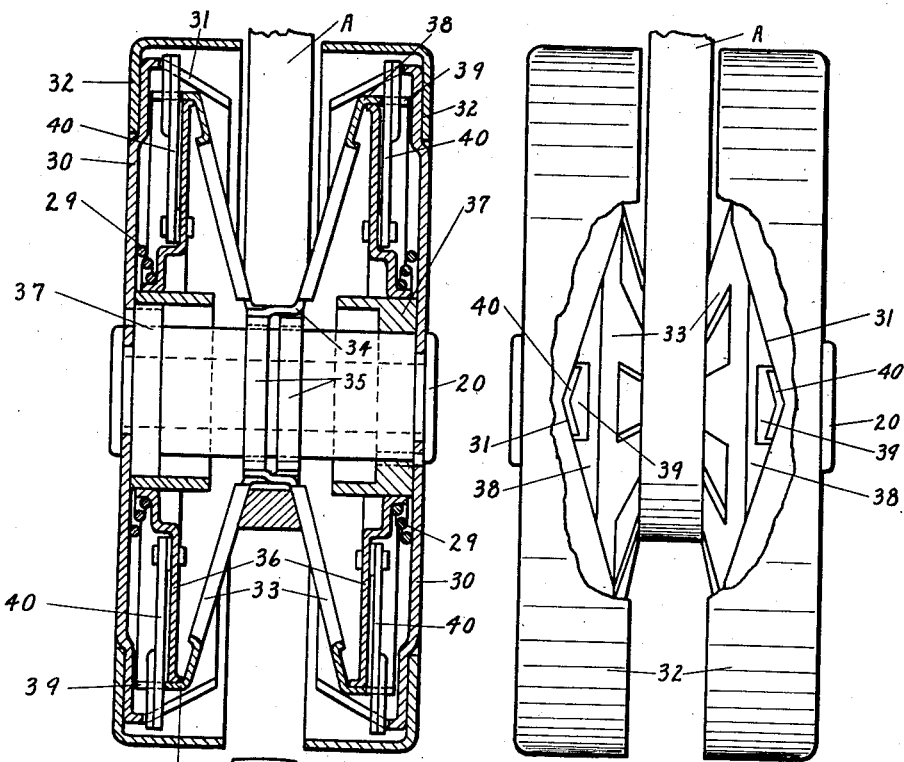
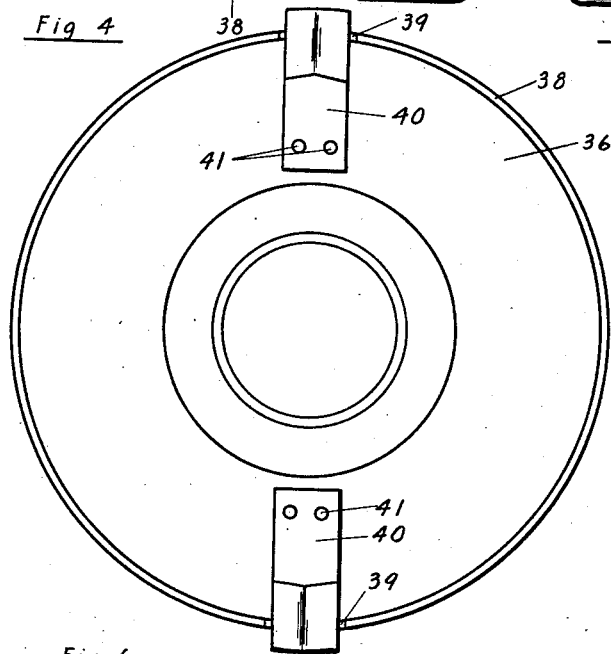
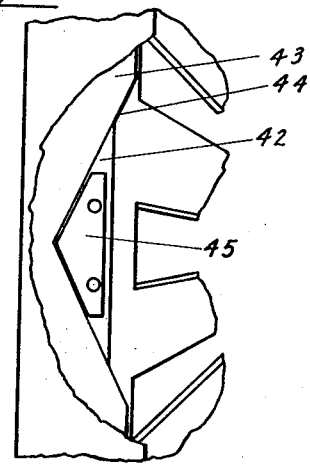
INVENTORS.
RICHARD H. SHADRICK
BY ISAAC E. McELROY
ATTORNEY Aug. 11, 1936.  I. E. McELROY ET AL  2,050,358
VARIABLE SPEED PULLEY
Filed Nov. 13, 1933   3 Sheets-Sheet 3

INVENTORS.
RICHARD H. SHADRICK
ISAAC E. McELROY
BY
ATTORNEY

Patented Aug. 11, 1936

2,050,358

UNITED STATES PATENT OFFICE 2,050,358

VARIABLE SPEED PULLEY

Isaac E. McElroy and Richard H. Shadrick, Minneapolis, Minn.

Application November 13, 1933, Serial No. 697,818

11 Claims. (Cl. 74—230.17)

This invention relates to variable speed transmitting devices and the main object is to provide means of an extremely simple, efficient, and practical nature for varying the relative speeds as between driving and a driven member used in the transmission of power in mechanical appliances. More particularly the object is to provide a greatly improved construction of power transmitting pulley in which an effective belt groove diameter is variable in accordance with predetermined and adjustable belt tension applied thereto, but which, on the other hand, is so designed that the resistance to the belt tension will in no way injure or strain the belt nor in any other manner impair the function and efficiency of the device, as occurs in somewhat similar previously designed devices that have come to our attention; and, in which also the belt tension is utilized to set up friction between the belt and the pulley faces to the extent necessary to pull the belt load without slippage and to such extent only, and if the load becomes lighter the side pressure upon the belt will automatically relieve itself. It is also to be noted that this last mentioned condition or action takes place without materially changing or varying the effective mesne diameter of the pulley. This prevents abnormal strains upon and consequent injuries to the belt, so objectionable in many previously designed devices, and thereby increases the general efficiency of the device and renders possible and practicable the use of standard and inexpensive V-belt stock in preference to a specially designed belt construction. These and still other more specific and detailed objects will be disclosed in the course of the following specification, reference being had to the accompanying drawings, wherein:

Fig. 1 is a plan or top view of one of the simpler forms of our improved variable speed pulley, showing adjacent portions of driving motor and driven pulley belt, in this instance the cooperative groove forming discs or parts of the pulley being at maximum spread positions so as to produce a minimum or relatively small belt groove.

Fig. 2 shows the pulley of Fig. 1 in its relatively constricted condition, at which time the groove forming discs are relatively close together so as to form a belt engaging groove of comparatively large diameter.

Fig. 3 is a sectional detail view taken diametrically through certain pulley parts, and with other parts omitted.

Fig. 4 is a diametrical sectional elevation of a variable speed pulley embodying certain modifications of the invention.

Fig. 5 is an edge view of the pulley as illustrated in Fig. 4, but with peripheral flange portions broken away for purpose of illustration.

Fig. 6 is an outer face elevation of one of the pulley disc units, shown in Figs. 4 and 5, as seen when removed from the pulley device.

Fig. 7 is an enlarged detail view of a modified form of the disc grip lug shown in Figs. 4–6.

Fig. 8 is a side elevation of a motor and pulley mounting and illustrating a preferred form of means for effecting the required belt tension adjustments.

Figure 10:
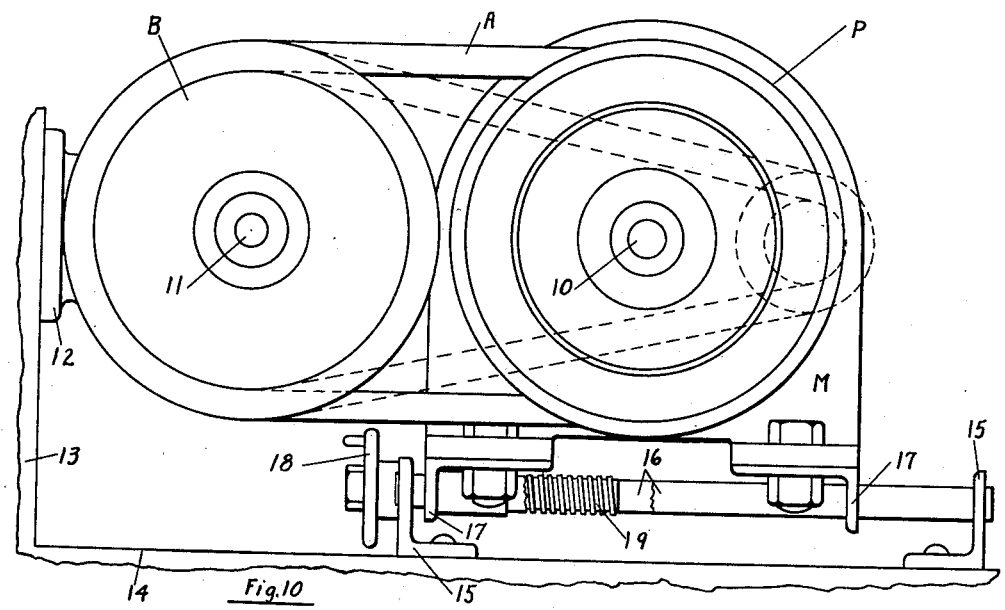

Referring to the drawings more particularly and by reference characters, M designates an electric motor, illustrative of a power unit, and it has a shaft 10 upon which is mounted the variable speed pulley P (Fig. 8), and which pulley may be of any of the forms shown as embodying the invention. The pulley P is, in the present instance, the driving pulley, and is connected by a belt A to a second or driven pulley B mounted on a shaft 11 of a bearing support 12. It is to be understood, however, that the pulleys B and P may be reversed, as to their driving arrangement, without conflicting with the spirit of the invention, and in some instances it may be found definitely preferable to utilize the variable diameter pulley as the driven member. In any event the principle of utilizing belt tension to vary the pulley diameter remains the same, and this may be effected either by changing the spacing between the shaft centers 10 and 11 or by engaging one span of the belt A between the pulleys B and P with a third adjustable pulley (not shown) to act on the belt to produce the required increase or decrease in tension.

In the present instance and for purpose of illustration we regulate the belt tension by moving the motor M back and forth with respect to the pulley support 12, which is rigid with a wall 13, while the motor base is rigid with the floor or other support 14. This base is made up of angle iron end pieces 15 connected by rails or rods 16 that slidably engage depending flanges 17 of the motor unit. A hand wheel 18 and screw 19 operate to shift the motor back and forth on the rails 16. Thus it will be seen that by turning the hand wheel 18 the relative positions of the shaft centers 10 and 11, and consequently the belt tension also, can be varied at will.

In the form of the invention as illustrated in Figs. 1, 2, and 3, 20 designates a central sleeve of the variable speed pulley, which sleeve is rigidly secured in any suitable manner upon the motor shaft 10. Rigidly and non-rotatably secured upon the ends of the sleeve 20 is a pair of end plates 21 having inwardly opposed peripheral flanges 22; which flanges at diametrically opposed points are cut out, as at 23, to provide oppositely inclined cam acting edges. Disposed between the plates 21, and oscillatable with respect to them, is a pair of interlaced groove forming discs 24, which are preferably also made of sheet metal, and at their respected peripheries are provided with integral, outwardly directed flanges 25, which complement the plate flanges 22 and have projecting cam portions 26 adapted to cooperate with the notches 23. The discs 24 are of course rotatable with respect to the sleeve 20, and their inner construction may follow that indicated in Figs. 4 and 9, or that shown for instance in Figs. 1, 4, or 6 of our co-pending patent application Serial No. 675,140, filed June 9th, 1933, for Variable speed pulley. The discs 24 are rotated through the action of the flanges 22 on the flange cams 26, these contacts being maintained by the resistance offered by the belt A, which belt is preferably of the tapered cross sectional type as more clearly illustrated in Fig. 4.

Figure 9:
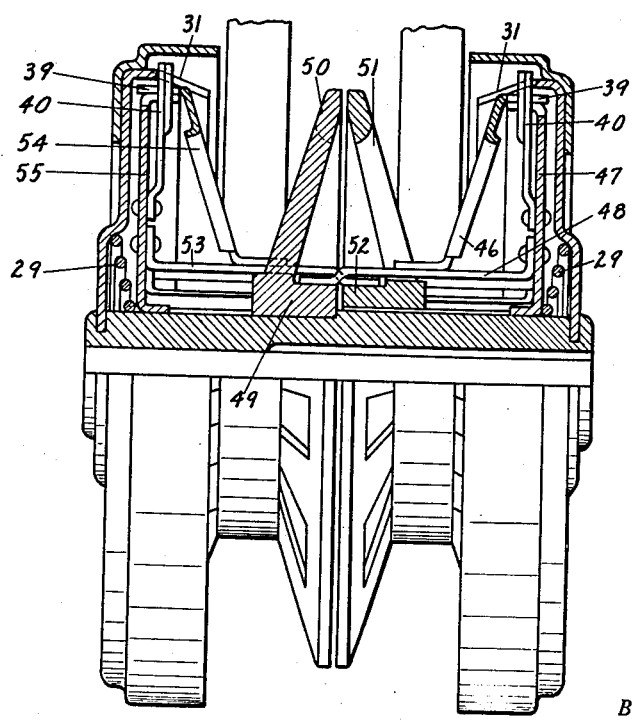
Fig. 9 is an elevation of a pulley partly in diametrical section, illustrating how the invention may be embodied in a double or other multiple belt unit.

The discs 24 are preferably pressed toward each other by spring fingers 27, or by coil springs 28 as shown in Figs. 4 and 9. The purpose of these springs is to eliminate noise and vibration, establish initial disc contact with the belt, and to some extent assist in centering the discs in proper belt alignment. It should be understood, however, that the springs are not absolutely essential to successful performance, and in no instance do they constitute driving or power transmission elements as between the motor shaft and the groove forming discs 24. In fact they exert very little pressure at any time, and it is important to note that they are thus clearly distinguishable from prior art devices in which springs constitute driving elements, or where they constitute the sole means for maintaining disc positions or belt friction, in which events they are useless for all practical purposes because of their injurious reactions to the belt thus driven. In the present instance if the belt is relatively loose when the motor is started it will give little or no resistance to the discs 24, until the discs have been brought close together under the action of the springs 27 and the action of the flanges 22 upon the cam portions 26 of the disc flanges 25. As soon, however, as the cam edges properly center themselves and form positive contacts with the inclined portions of the flanges 22, then the discs will immediately establish a driving contact or friction with the belt A and cause it to rotate with the pulley unit as a whole. It will thus be seen that the belt resistance will always be equalized by the resistance between the inclined flange edges, and when these edges are properly designed the resistance or squeezing effect upon the belt will be directly proportioned to the load and at no time be noticeably greater than with a conventional or one piece pulley. This is of substantial importance as this arrangement eliminates and prevents the destructive lateral pressure to the belt as occurs in prior art constructions that have come to our knowledge and in which instances incorrect principles or systems of leverage have been employed when belt groove diameters were to be either increased or decreased.

If the belt tension is now increased either by spreading the shaft centers 10 and 11, or by the use of a third pulley as above suggested, then the belt will have a spreading effect upon the discs, and this in turn will cause the cam portions 26 to move outwardly into the notches 23 until the belt tension has again been reduced to a point where it will be equalized by the resistance between the cam edges of the flanges 22 and 25. This action may of course take place even when the motor is running, and if the belt tension is sufficiently increased then the belt will ultimately reach the minimum pulley radius, which is evidenced in Fig. 1, at which time the cam members 26 have completely filled or spread into the cut out portions 23 of the plate flanges 22.

When the above described condition is now reversed, it will be seen that slackening or reduction of tension in the belt A will decrease the spreading resistance between the discs 24, and consequently the cooperating cam edges will permit a slight slippage until the cams 26 have moved slightly toward each other or until the driving resistance between the plates 21 and discs 24 is again equal to the resistance between the now enlarged pulley groove and the belt A.

It may be explained that the term "belt tension" as herein employed, and which tension is that utilized for the purpose of increasing and decreasing the effective pulley diameter, is the mean resistance or average tension between the tight and slack sides of the belt, and it is this tension, produced only by varying the pulley centers or by using a third pulley, that is capable of changing the effective pulley diameter. Merely increasing or decreasing the tension on the tight side of the belt, as by increasing or decreasing the load or resistance on one of the pulleys connected by the belt, will not change the diameter or driven speed, because the angles of the cam surfaces are such that they resist or absorb such load pressure in substantially right angular directions, and consequently permit no slippage or movement of the pulley discs to alter the predetermined diameter condition. This is rendered possible by not only properly angling the cam surfaces, but by placing them at the outer peripheries of the discs where they can utilize a principle of leverage that operates entirely different than is otherwise possible. Thus if the cam action is arranged radially within the effective pulley diameter, or near the shaft, it is impossible to so angle the cam surfaces that they will cooperate to produce both the diameter increasing and decreasing actions, in response to differences in belt tension, without first building up frictional resistance on the cam surfaces beyond that which would render automatic operation possible. In other words, if such a cam surface has an angle with respect to the shaft axis that is sufficiently great to cause proper closing of the pulley discs toward each other, when the belt tension is slackened, then the angle of such cam surfaces will set up such great resistance to the spread of the discs that it will be impossible for any ordinary belt to withstand the pull necessary to restore the discs to relatively open or smaller diameter condition, as the lateral pressure on the belt would be destructively excessive. On the other hand, if such cams were disposed at lesser angles to the axis, to diminish lateral resistance, then a release in belt tension will not be followed by a reaction of the pulley sections that will cause the latter to sufficiently impinge on the belt to give it the necessary driving friction. And even if this difficulty were overcome then the return action, i. e., the closing together of the discs to increase the effective belt diameter, would be impossible, except by the addition of supplemental, mechanical devices, as the friction of the discs on the acutely angled cam surfaces would be so great as to prohibit axial movement. By placing the cam actions at the outer peripheries or radially beyond the normal belt groove diameters, however, the pulley adjustment resistance is negligible, and as the belt tension is either increased or decreased the pulley sections will automatically and immediately adjust themselves accordingly, and without the aid or intervention of supplemental mechanical devices.

It will be noted with particular reference to Fig. 2, that as the cam acting notches 23 are directly opposite each other, the cam portions 26 of the pulley discs being also directly opposed will naturally center themselves between the plates 21, and thus tend to maintain proper alignment with the belt and the driven pulley, with a result that it is unnecessary to provide other means for maintaining such alignment. It should also be noted that the cam members 26 have cam acting edges which are inclined in similar but opposite directions, and that the cam notches 23 also provide pairs of inclined cam edges which are similarly reversed in form, with a result that the same action is obtained in the operation of the pulley, regardless of which direction it may be driven in. This is of course of particular importance when the pulley is used in a driving connection where the direction of rotation is reversed from time to time.

In the form of the invention as illustrated in Figs. 4, 5, and 6, the outer plates 30 are substantially the same as the previously described plates 21, and have diametrically opposed cam notches 31 similar in form to the notches 23 of the pulley shown in Figs. 1, 2, and 3. In this instance, however, the outer portions of the plates 30 are slightly offset inwardly, and a pair of angle iron rims 32 are secured by spot welding or otherwise to the plates so as to inclose and conceal from view the interior mechanism of the pulley. The belt receiving groove in this case is defined by a pair of interlacing discs 33 which are trunco-conical in form, and at the inner ends of their spoke forming portions are secured by finger extensions 34 to ring members 35 that are slidable and rotatably secured upon the sleeve 20. The outer peripheral portions of the discs 23 are rigidly secured to plate members 36 which have bearing engagement upon bearing rings 37 secured upon the respective ends of the sleeve 20 adjacent the plates 30. The disc plates 33 are provided at their peripheries with outwardly extending flanges 38 which project beyond the plates 36, but unlike the flanges 25 of the pulley shown in Figs. 1 and 2, are disposed radially within the cam flanges of the plates 30; and in place of the previously described cam members 26 the flanges 38 are provided with notches or recesses 39 in which are disposed the outer ends of spring levers 40 which are secured at their inner ends as at 41 to the plates 36, while their outer ends extend beyond the flanges 38 to engage in the cam recesses 31. These spring arms or cams 40 serve the same identical function or purpose as the cam portions 26, but have the additional advantage of flexibility of adaptation whereby there will be produced a more uniform contact, and these yieldable cams also eliminate any possibility of vibration or noise resulting from non-uniformity of contact between cam acting portions at different peripheral points of the pulley, as sometimes occurs with the construction shown in Figs. 1 and 2, and this flexibility of adaptation also of course eliminates to a large extent the degree of precision and exactness in manufacturing which would otherwise be required.

The flexibility of the members 40 also serves to cushion and silence the contact occurring when the driving pulley members 30 first engage the driven or disc members 33.

A further difference in this pulley will be noted in that helical springs 29 have been substituted for the spring fingers 27 previously described.

In the modification of the invention as shown in Fig. 7, the disc flange 42 is also disposed within the plate flange 43, which has the cam recess 44, but in this instance driving contact is established between the flanges 42 and 43 by a lug 45 which is spot welded or otherwise secured upon the outer surface of the flange 42 so as to engage in the cam recess 44 in exactly the same manner as the recess 23 is engaged by the cam 26 in Figs. 1 and 2.

In the modification of the invention as illustrated in Fig. 9, the same identical principle is embodied throughout as that above described in connection with Figs. 4, 5, and 6, and the only other object of this illustration is to show how the invention may be embodied in a pulley structure adapted to accommodate two or more belts. In this instance the groove forming disc 46 and plates 47 are connected by a circular series of fingers 48 to a collar 49 supporting a similar disc 50. In like manner a similar disc 51 mounted on a ring 52 is connected by arms 53 to the disc 54 and plate 55 at the other side of the pulley. Thus the discs 51 and 54 are moved in unison as are also the discs 46 and 50, with a result that the two belt grooves thus defined by these discs will always maintain a similar or uniform belt groove diameter. In similar manner additional discs may be provided where it is necessary or desirable to accommodate more than two power belts.

It may here be noted that we have in each of the illustrated forms of the invention shown the angular or slanted friction contacts between the fixed and oscillatable pulley parts at outer peripheral points rather than near or at inner or hub points. This we have found to constitute a valuable feature inasmuch as it takes advantage of a better system or principle of leverage and prevents the destructive lateral clamping pressure on the belt which would otherwise occur.

It may also be noted that in each instance we have illustrated the cooperating cam acting edges as being straight, when viewed in plan. In certain instances, however, we find it desirable to curve these edges into gradual hyperbolic or other compound curves as such contours can be utilized to more efficiently control and equalize the operative belt resistance at the different radial points of belt contact.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A variable speed power transmission comprising a belt pulley mounted on a shaft and composed of two primary parts cooperating to form a variable belt groove and having freedom for axial and oscillating movements with respect to the shaft in response to changes in belt tension to thereby increase and decrease the effective belt groove diameter of the pulley, secondary pulley parts non-rotatably secured with respect to the shaft adjacent the primary parts, said primary and secondary pulley parts having cooperating means disposed radially outwardly of the effective belt groove diameter for establishing an oblique driving contact between the primary and secondary parts.

2. A variable speed power transmission comprising a belt pulley mounted on a shaft and having a belt groove formed by a pair of interlaced trunco-conical disc members having limited freedom for oscillating and axial movements on the shaft in response to changes in belt tension to thereby increase and decrease the effective belt groove diameter, and means, relatively rigid with respect to the shaft, and for contact with the disc members at points radially outwardly with respect to the belt contacting surfaces of the disc members, for obliquely acting upon the members, to urge them inwardly and for maintaining rotation of the members with the shaft.

3. A pulley comprising a hub, a pair of belt groove forming trunco-conical discs carried by the hub and having freedom for limited axial and turning movements with respect thereto, and means carried by the hub for obliquely acting upon the discs from opposite directions, and at points radially outwardly of belt contact with the discs, for urging the discs inwardly to maintain operative belt contact and alignment, and for cooperation with the said disc movements in response to changes in belt tension to automatically increase and decrease the effective belt groove diameter as said belt tension is decreased and increased.

4. A pulley comprising a hub, a pair of trunco-conical discs forming a belt groove and carried by the hub with freedom for limited axial and turning movements with respect thereto, and means carried by the hub for obliquely acting upon the discs at points disposed radially outwardly of belt-disc contact to produce said axial and turning disc movements in response to differences in belt tension and thereby increase and decrease the effective belt groove diameter between the discs as the belt tension is respectively decreased and increased, said discs being interlaced and telescoped so as to be rotatable in unison and to permit forming of a belt groove of maximum diameter.

5. A variable speed pulley comprising a hub, a pair of belt groove forming discs having freedom for limited slidable and oscillatable movements on the hub, stop members carried by the hub and obliquely engageable with peripheral parts of the discs, outwardly of the belt groove, to establish driving contact therewith, said stop members cooperating with the disc movements to automatically produce spreading and closing movements of the discs in direct response to increases and decreases in the mean tension between the tight and slack sides of the belt.

6. A variable speed pulley comprising a hub, a pair of belt groove forming discs having freedom for limited slidable and oscillatable movements on the hub, stop members carried by the hub and obliquely engageable with the discs to establish driving contact therewith and at points radially outwardly of the effective belt groove diameter therebetween, said stops cooperating with said disc movements to produce spreading and closing movements of the discs in direct response to changes in the mean tension between the tight and slack sides of the belt and without interfering with said driving contact, and resilient means carried by the hub and acting on the the discs tending to urge the discs toward each other.

7. A pulley of the character described comprising a hub having a pair of circular end plates secured thereto, a pair of belt groove forming discs mounted on the hub between said plates, means carried by the end plates adjacent the peripheries thereof for establishing oblique driving contact with the respective discs at points radially outward of the effective belt groove diameter and for spreading and closing the discs with respect to each other in direct response to increases and decreases in belt tension applied in the groove.

8. A variable speed pulley comprising a hub, a pair of belt groove forming discs mounted on the hub and movable with respect to each other in response to changes in belt tension to thereby increase or decrease the effective belt groove diameter, a plate fixed on the hub adjacent one of the discs and being provided with circumferentially spaced recesses disposed radially outwardly of the effective belt groove diameter, and contact members secured to said last mentioned disc but yieldable with respect thereto and for engagement in said recesses.

9. A variable speed mechanism comprising a hub, a pair of belt groove forming members mounted on the hub and having freedom for limited oscillating and sliding movements thereon, a pair of end plates fixed on the hub outwardly of said members, and obliquely acting means disposed radially outwardly of the effective belt groove diameter and forming driving contacts between peripheral points of the respective belt groove forming members and said end plates and operative to spread and close the said members with respect to each other in direct response to variations in the mean tension between tight and slack sides of the belt.

10. A variable speed power transmission device comprising a rotatable member, a pair of belt groove forming discs mounted upon the member and at least one of which is axially and oscillatable adjustable with respect to the member, and cam acting means for engaging the said movable disc at a point radially outwardly of the effective belt groove between the discs and operative to effect said disc adjustments in response to changes in belt tension to increase and decrease the effective belt groove diameter.

11. In a variable speed device, the combination of: a drive shaft; a driven shaft; a pair of pulleys, one of said pulleys being associated with said drive shaft and the other of said pulleys being associated with said driven shaft, a belt passing about and operatively connecting the pulleys, means supporting the pulleys and for adjusting one of the pulleys toward and away from the other pulley to decrease and increase the mean tension between tight and slack sides of the belt; one of said pulleys comprising a hub, a pair of belt groove forming sections carried by the hub and having freedom for limited axial and oscillating movements with respect thereto, means carried by the hub, and for contact with the pulley sections at points disposed radially outwardly of the effective belt groove diameter between the sections, for obliquely acting upon the sections to cause them to rotate with the hub, said means being operative to impart axial and oscillating movements to the sections to thereby increase and decrease the effective diameter of the pulley in direct response to the changes in said mean belt tension produced by adjusting the pulleys with respect to each other.

ISAAC E. McELROY.
RICHARD H. SHADRICK.